March 27, 1956 J. H. MACKANESS ET AL 2,739,719
HYDRAULIC BAG LOADER FOR VEHICLES
Filed July 9, 1952 2 Sheets-Sheet 1
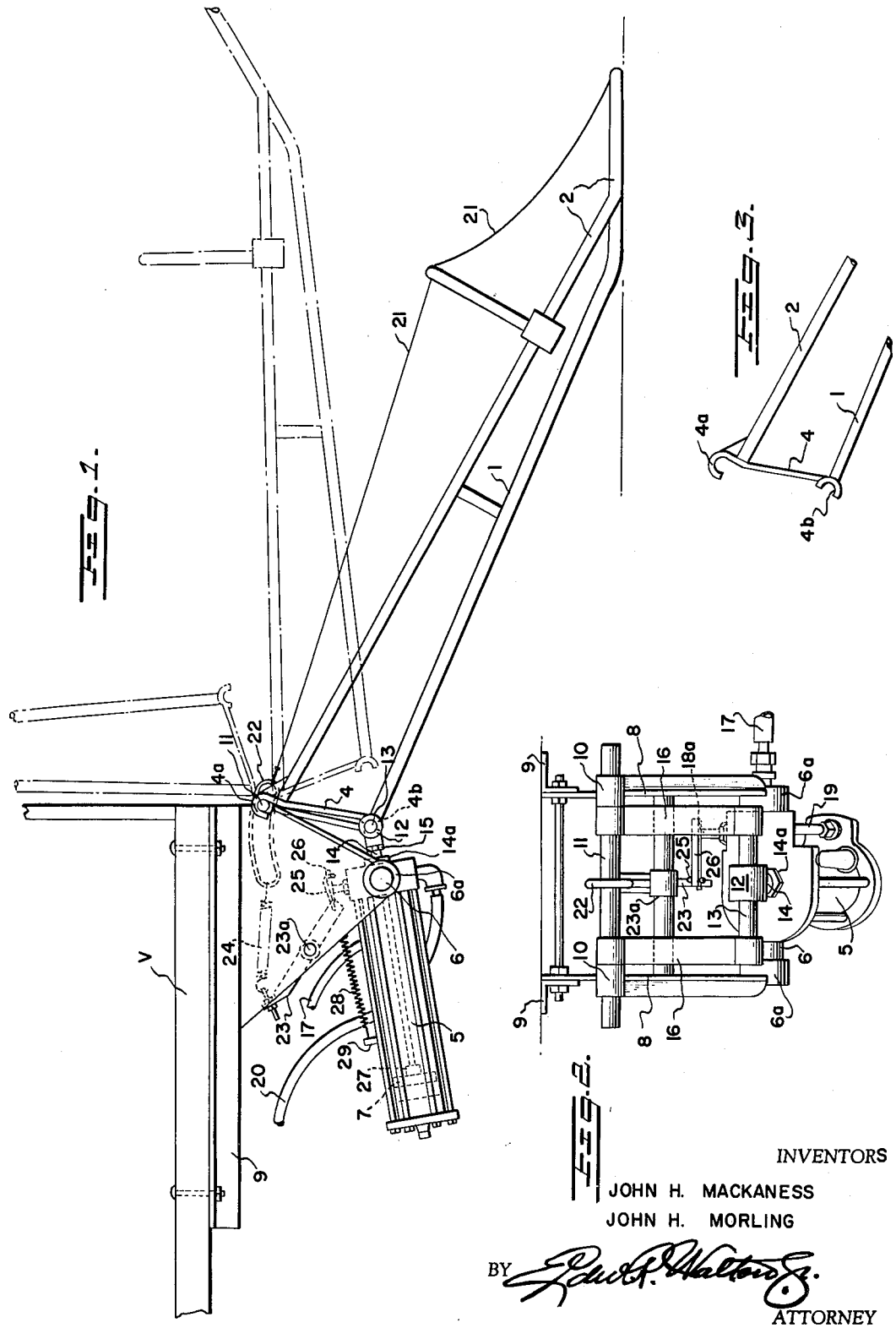
INVENTORS
JOHN H. MACKANESS
JOHN H. MORLING
BY
ATTORNEY March 27, 1956  J. H. MACKANESS ET AL  2,739,719
HYDRAULIC BAG LOADER FOR VEHICLES
Filed July 9, 1952  2 Sheets-Sheet 2
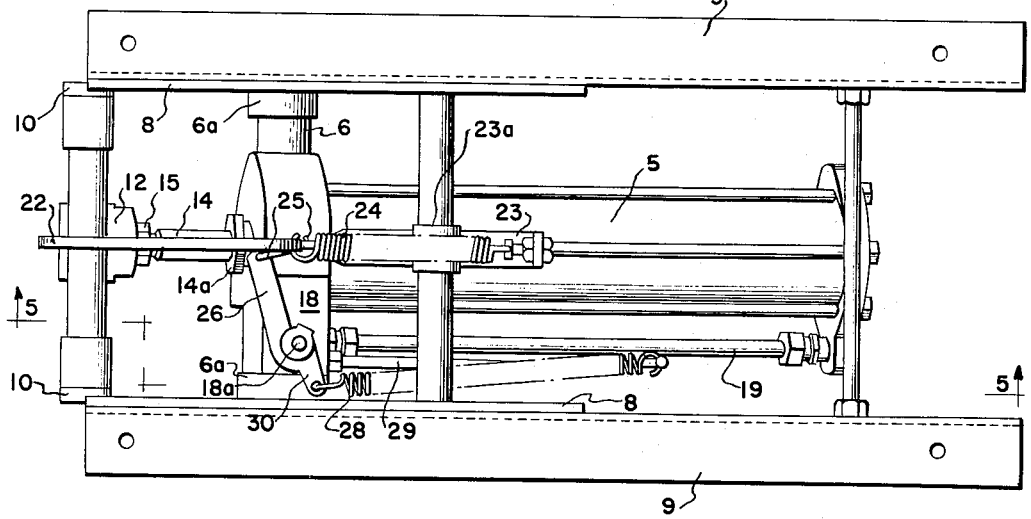
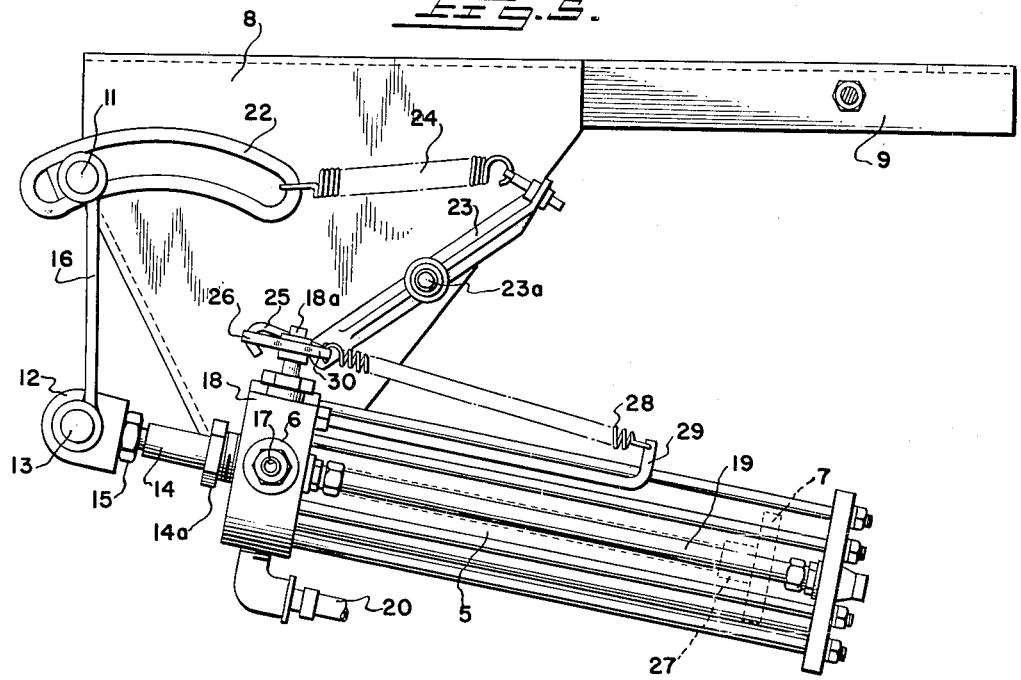
INVENTORS
JOHN H. MACKANESS
JOHN H. MORLING
BY 
ATTORNEY

United States Patent Office 2,739,719
Patented Mar. 27, 1956

2,739,719

HYDRAULIC BAG LOADER FOR VEHICLES

John H. Mackaness and John H. Morling, Billing, Northampton, England

Application July 9, 1952, Serial No. 297,816

Claims priority, application Great Britain July 10, 1951

9 Claims. (Cl. 214—77)

This invention relates to hydraulic bag loaders of the known type which, briefly, comprises a bag-supporting cradle, the inner end of which is pivotally mounted upon a vehicle, a hydraulic cylinder pivotally carried by, and below, the vehicle floor structure, and a piston slidable in the cylinder and having a rod which is attached by a cross-head to the cradle.

In the known bag loaders of this type liquid is pumped into the cylinder by means of a pump on the vehicle and when the cradle is in its lowered position and a bag is not mounted upon it, the piston then being in its innermost position in the cylinder, the liquid is circulated idly in the cylinder through an open control valve. A flexible strap is arranged lengthwise upon the cradle and is coupled to the valve through lever and chain mechanism, the arrangement being such that when the bag is laid on the cradle it presses the strap downwards and the valve is closed, whereupon the pressure liquid forces the piston outwards in its cylinder and the cradle is swung upwards into the loading position.

When the cradle has reached the loading position the piston uncovers a port in the cylinder and the liquid is again circulated through a return pipe from the pump through the cylinder, the control valve still being closed. As soon as the bag is removed from the cradle, however, the strap flexes outwards and the valve is opened, whereupon the piston moves inwards and the cradle is automatically lowered.

Such a hydraulic bag loader has several disadvantages. In particular, it is not a simple matter to remove the cradle from the vehicle, since the piston rod has to be uncoupled from the cradle and the pivoted cylinder has to be locked against swinging downwards by means provided for that purpose. Thereafter, the means whereby the cradle is pivotally attached to the vehicle have to be removed. For this reason, when not in use, the cradle is usually locked in a fully elevated position.

A further disadvantage of such apparatus is that owing to the fact that the strap tensioning spring is located adjacent the hydraulic operating means in a more or less inaccessible position a strap or chain of considerable length is required and is only with difficulty removable for replacement or repair or when the cradle is detached.

The present invention has the advantage that it simplifies the attachment of the cradle to the vehicle and permits of its ready and easy removal. It obviates the use of supporting brackets or stays for the cylinder when the apparatus is not in use. Further, the cylinder is so mounted that it is maintained in a balanced position when the apparatus is not in use and the cradle has been removed.

According to the present invention therefore there is provided an hydraulic bag loader of the type referred to wherein the hydraulic fluid cylinder is adapted to be pivotally mounted on the vehicle at the end of the cylinder remote from the end at which the piston is located when in its innermost position, the cylinder being retained against downward swinging movement without the use of retention means when the piston rod is uncoupled from the cradle.

The cylinder is preferably carried by two spaced trunnion mountings including bearings provided on two downwardly-extending brackets carried on the underside of the vehicle floor-supporting structure.

Means are also provided for detachably attaching the inner end of the cradle to the vehicle and such means conveniently consist of links or straps which are pivotally suspended from the chassis structure at their upper ends and are provided at their lower ends with open seatings in which is engaged a cross shaft upon which a cross-head at the outer end of the piston rod is pivotally mounted. Both ends of each link or strap are preferably of hook formation and the vehicle or inner ends of upper structural members of the cradle are attached to the upper hooked ends of the links or straps, while lower structural members are attached to the lower hooked ends or seatings. The arrangement is such that the upper ends may be detachably and pivotally suspended from the said cross shaft while the lower ends form open seatings which are pressed against the cross-head shaft under the weight of the cradle or of the latter and the bag.

In order that the invention may be more clearly understood there will now be described by way of example one particular form of hydraulic bag loader which is illustrated in the accompanying drawings, in which:

Figure 1 is a side elevation of part of the rear of a vehicle equipped with the bag loader;

Figure 2 is an enlarged end elevational view from the direction of the arrow of Figure 1;

Figure 3 is a fragmentary side view of the inner or connectible end of the bag loading cradle;

Figure 4 is a plan view of the cradle actuator, that is to be secured to the under rear portion of a vehicle as shown in Figure 1, with the cradle omitted; and Figure 5 is a longitudinal secional view of the actuator shown in Figure 4 and taken substantially upon line 5—5 of Figure 4.

The cradle consists in known manner, of a framework 1 of inter-connected bars or tubes, the outer end parts of the upper bars or tubes 2 being shaped to carry a bag. The end of each pair of these two longitudinal bars or tubes 1 and 2 is attached to a plate link 4 which is curved over at its upper end away from the cradle to form a hook 4a of a cross-section slightly greater than a semi-circle. The lower end of each plate link 4 is also curved to form a seating 4b which faces away from the cradle and is of substantially semi-circular section.

The hydraulic cylinder 5 is provided on opposite sides with two co-axial trunnions 6 which are located close up to that end of the cylinder which is remote from the end occupied by the piston 7 when the latter is at the inner end of its stroke.

Each trunnion 6 is pivotally mounted in a bearing 6a provided on a downwardly-extending cheek plate bracket 8, the two brackets 8 being secured to two angle supports 9 fixed to the underside of the vehicle floor structure. Two co-axial hollow bosses 10 are provided on opposite sides of each plate bracket 8 close up to the underside of the vehicle floor and a suspension or cross shaft 11 is carried in bearings provided in the two sets of bosses.

A hollow cross-head 12 is adjustably fixed to the outer end of the piston rod 14 and has a cross-head shaft 13 extending laterally therefrom at opposite side thereof. The cross-head shaft 13 is parallel to the above mentioned cross shaft 11 and is pivotally suspended therefrom at its opposite ends by rigid links 16. The cross-head 12 is screwed upon the piston rod 14 and may be locked in various adjusted positions by a locknut 15.

When the loader is to be used the upper ends 4a of the two plate links 4 are hooked over the cross shaft 11 (see Figures 1 and 2) and the curved lower ends or seatings 4b are engaged over the cross-head shaft 13, with which they are maintained in contact under the weight of the cradle.

In order to detach the cradle it is only necessary to disengage the two seatings 4b from the cross-head shaft 13 and to lift the upper hooked ends 4a off the cross shaft 11.

The cylinder is then held steady in an inclined position without the use of retention means, and does not swing downwards about its trunnion bearings. This is by reason of the pair of suspension links 16 which extend between the cross shaft 11 and the cross-head shaft 13 and maintain constant centres for the easy attachment of the cradle, and the friction and (or) pressure on the piston 14 and rods. Without the links 16, the cylinder 5 would be free to rotate on its trunnions and so fall to a vertical position, but by means of the links 16 the amount is limited by the radius of the links, so that should the friction or pressure be non-existent the cylinder 5 could never fall beyond the radius as for normal working positions. It has been proved in practice that no movement of the cylinder 5 in fact takes place, because after the removal of the cradle residual pressure in the cylinder, together with the friction of the piston gland 14a, are more than sufficient to retain the weight of the cylinder.

The loader is operated by means of a hydraulic pump (not shown) driven from the vehicle or by a separate power unit, if required, the fluid being pumped along a flexible tube 17 into one of the trunnions 6 whence it passes through a three-way valve or plug cock 18 at the pivoted end of the cylinder and along a tube 19 to the end of the piston, when the latter is in the working or raised position, and through a return tube 20 when the apparatus is in the resting or lowered position back to the pump supply cylinder or tank.

When a bag or other load is placed on the distal end of the cradle, it depresses a strap 21 extending longitudinally of the cradle and connected to an end of a slotted draw bar or link 22 through which the cross shaft 11 extends and serves as a guide and retaining member therefor. The other end of the draw bar 22 is connected to one end of a lever 23, pivoted at 23a intermediate its ends, by a helical tension spring 24 and the other end of the lever is connected by a link 25 to a laterally extending arm 26 fast on the rotatable stem 18a of the valve 18. When the strap 21 is depressed, the spring 24 is thereby stretched or extended and, through the linkage just mentioned, operates the plug cock valve 18 to admit hydraulic pressure from the pipe 17 through the pipe 19 to the piston head 7, causing the latter to move, from its position indicated in Figure 1, toward the pivoted end of the cylinder 5, whereby the cradle is raised to a vertical position (shown in dotted lines in Figure 1) in which the bag is at shoulder height with respect to an attendant on the vehicle. When the piston has reached the limit of its movement toward the pivoted end of the cylinder 5, a spring loaded valve 27 on the piston is then opened and the fluid is free to pass therethrough to a return tube or pipe line 20 for as long as the piston is fully extended.

When the bag or load is removed from the cradle, the tension spring 24 is relieved of the tension which had been imposed thereon and the valve stem 18a is rotated in an opposite direction by a return spring to cut-off the hydraulic pressure to the piston head 7. This return spring may be a helical tension spring 28 connected at one end to a suitable fixed bracket 29 and at its other end to a second arm 30 extending laterally from the valve stem 18a. The contraction of the spring 24, by reason of the load being relieved from the tape or strap 21, draws back the draw bar 22 so as to take up the slack in the strap 21 and the cradle falls by gravity to the down position ready for the next operation.

An advantage of this arrangement is that by reason of the mounting of the draw bar 22 on the cross shaft and the connection therewith of the return spring only a relatively short strap is required, such a strap being readily attachable and detachable as by means of a snap hook as shown, as required.

It should be understood that the hydraulic bag loader which has been described is illustrative only of the invention various modifications within the scope of the appended claims being possible.

We claim:

1. An hydraulic bag loader of the type for vehicles comprising a hydraulic fluid cylinder pivotally mounted on the vehicle at the end of the cylinder remote from the end at which the piston is located when in its innermost position, a load supporting cradle, detachable means pivotally connecting the cradle to the vehicle for swinging movement relative to the vehicle, and further means detachably connecting the cradle to the piston rod of the cylinder to impart movement to the cradle, the cylinder being retained against downward swinging movement about its pivot without the use of retention means, when the piston rod is uncoupled from the cradle.

2. An hydraulic bag loader in accordance with claim 1 in which the cradle is detachably supported by means of at least one link member which is pivotally suspended from the vehicle by its upper end with its lower end seated against the piston cross-head shaft.

3. An hydraulic bag loader in accordance with claim 1 including a pair of link members secured to one end of the cradle, the upper ends of the link members being shaped to hook over a shaft on the vehicle and the lower ends of the link members being shaped to seat against the piston cross-head shaft so that outward movement of the piston towards the pivoted end of the cylinder causes the cradle to swing about the upper ends of the link members into its raised or working position.

4. An hydraulic bag loader in accordance with claim 3 including means extending between the suspension shaft and the cross-head shaft for ensuring correct radial separation of these shafts and facilitating attachment of the cradle.

5. An hydraulic bag loader in accordance with claim 4 wherein said means consist of a pair of suspension links which are also effective to limit any downward swinging movement of the free end of the cylinder.

6. An hydraulic bag loader in accordance with claim 1 wherein the hydraulic cylinder is provided with trunnions which are mounted in bearings on downwardly extending brackets secured to the vehicle.

7. An hydraulic bag loader in accordance with claim 6 wherein the suspension shaft for the cradle extends between the said brackets and is supported thereby.

8. An hydraulic bag loader in accordance with claim 7 including a slotted draw bar mounted on the suspension shaft for transmitting movement of a flexible strap on the cradle to the means for controlling the flow of hydraulic fluid to the cylinder.

9. An hydraulic bag loader in accordance with claim 8 wherein a spring is connected with the draw bar which is thereby effective to take up the slack in the flexible strap when the cradle is unloaded.

References Cited in the file of this patent

UNITED STATES PATENTS

| | | |
|---|---|---|
| 1,802,409 | Deutscher et al. | Apr. 28, 1931 |
| 2,033,243 | Jester | Mar. 10, 1936 |
| 2,353,655 | Day | July 18, 1944 |
| 2,457,039 | Graves et al. | Dec. 21, 1948 |

FOREIGN PATENTS

| | | |
|---|---|---|
| 112,402 | Australia | Jan. 23, 1941 |
| 113,577 | Australia | Aug. 14, 1941 |
| 256,991 | Switzerland | May 4, 1946 |